United States Patent [19]

Shepherd et al.

[11] Patent Number: 5,110,169
[45] Date of Patent: May 5, 1992

[54] GREASE LOADED GRAPPLE DAMPENER

[75] Inventors: Leonard L. Shepherd; Cyril W. VonFumetti, both of Dubuque, Iowa

[73] Assignee: Deere & Company, Moline, Ill.

[21] Appl. No.: 592,714

[22] Filed: Oct. 3, 1990

[51] Int. Cl.$^5$ .................. B66C 1/00; B66C 13/06; F16F 11/00
[52] U.S. Cl. .................. 294/119.4; 188/83; 188/367
[58] Field of Search .............. 294/86.4, 88, 119.4; 37/183 R; 188/83, 352, 366, 367, 381; 403/15, 31, 113, 120, 146; 414/626, 732-735, 738-740

[56] References Cited

U.S. PATENT DOCUMENTS

| | | | |
|---|---|---|---|
| 3,301,587 | 3/1965 | Heikkinen | 294/119.4 X |
| 4,417,759 | 11/1983 | Pierrot, III et al. | 294/119.4 |
| 4,572,567 | 2/1986 | Johnson | 294/119.4 |
| 4,573,728 | 3/1986 | Johnson | 294/119.4 |
| 4,679,839 | 7/1987 | Damron | 294/119.4 |
| 4,715,641 | 12/1987 | Palmer | 294/119.4 |
| 4,717,191 | 1/1988 | Farmer | 294/119.4 |
| 4,723,639 | 2/1988 | Hungerford | 294/119.4 X |
| 4,810,020 | 3/1989 | Powell | 294/119.4 |

FOREIGN PATENT DOCUMENTS 3703901 8/1988 Fed. Rep. of Germany ... 294/119.4

Primary Examiner—Johnny D. Cherry

[57] ABSTRACT

A grease loaded dampener for the swivel link of a grapple skidder is mounted to the pivot pin of the swivel link. The dampener is provided with two sets of friction plates. The friction plates are compressed by an annular piston that is slidably mounted to a bushing that is secured to the pivot pin. A grease zerk supplies grease to the cylinder formed between the bushing and the annular piston. A pressure relief valve is in fluid communication with the cylinder and prevents the cylinder from becoming over pressurized unduly compressing the friction plates.

2 Claims, 2 Drawing Sheets

GREASE LOADED GRAPPLE DAMPENER

BACKGROUND OF THE INVENTION

1. Field of the Invention

The invention is directed to a grease loaded dampener for a grapple skidder having a pressure relief valve to prevent over compressing the friction plates.

2. Description of the Prior Art

Grapple skidders are forestry work vehicles used to haul logs in rugged terrain. The skidder is typically provided with a boom that can be manipulated into a variety of positions. A grapple is mounted to the end of the boom by a swivel link. The swivel link is pivotally coupled to the boom by a first pivot connection and pivot pin, and to the grapple by a second pivot connection and pivot pin.

Each pivot connection of the swivel link is typically provided with at least one dampener for dampening any excessive oscillations occurring in the swivel link by the swinging movement of the unloaded grapple. Typically the first pivot connection is provided with a first dampener that comprises a first set of friction plates located on a first pivot pin. The first set of friction plates are operatively coupled to the swivel link and the boom. Similarly, the second pivot connection is provided with a second dampener that comprises a second set of friction plates located on a second pivot pin. The second set of friction plates are operatively coupled to the swivel link and the grapple.

The pivot pins may be stepped pins having an enlarged portion adjacent to the pivot connection and a smaller portion on which are mounted the friction plates. The smaller portion is also provided with a threaded surface for receiving a jam nut and a retaining washer for compressing the friction plates. The operator at selected intervals tightens the jam nut with a torque wrench compressing the friction plates to ensure proper braking force. Such dampeners are disclosed in U.S. Pat. No. 4,417,759, assigned to the assignee of the present application.

Instead of a jam nut and a retaining washer to supply a compressing force on the friction plates, hydraulic and grease loaded dampeners have also been proposed. See U.S. Pat. Nos. 3,301,587 and 4,572,567. Grease loaded dampeners use pressurized grease to drive a piston against the friction plates to increase the braking force. Such a dampener is disclosed in U.S. Pat. No. 4,679,839. The operator when greasing the machine injects grease through a grease zerk into the dampener. This drives the piston towards the friction plates increasing the braking force.

Operators must periodically adjust the compression force of the jam nut on the mechanical dampener, or apply grease to the grease dampener. Many times operators over-tighten the jam nut and over-pressurize the grease dampener. This excessive compression force on the friction plates leads to accelerated wear on the friction plates and their early replacement.

SUMMARY

It is an object of the present invention to provide a dampener that cannot be overly compressed.

It is a feature of the present invention that the dampener of the present invention is a grease loaded dampener that is provided with a pressure relief valve.

The present invention comprises a grease loaded dampener for a swivel link. The swivel link extends between a boom and a grapple on a grapple skidder. The swivel link is provided with two pivot connections, each of which are provided with pivot pins. Friction plates are mounted to the pivot pins. A first set of friction plates is mounted on the first pivot pin and operationally extend between the swivel link and the boom. A second set of friction plates is mounted to the second pivot pin and operationally extend between the swivel link and the grapple.

The friction plates are compressed by first and second grease loaded dampeners mounted to the first and second pivot pins, respectively. Each of the grease loaded dampeners comprises a stationary bushing mounted to the pivot pin and an annular piston slidably positioned on the bushing. Grease is applied to the cylinder formed between the piston and bushing through a grease zerk. Also in fluid communication with the so-formed cylinder is a pressure relief valve which drains grease from the dampener if the cylinder becomes over-pressurized.

DETAILED DESCRIPTION

Figure 1:
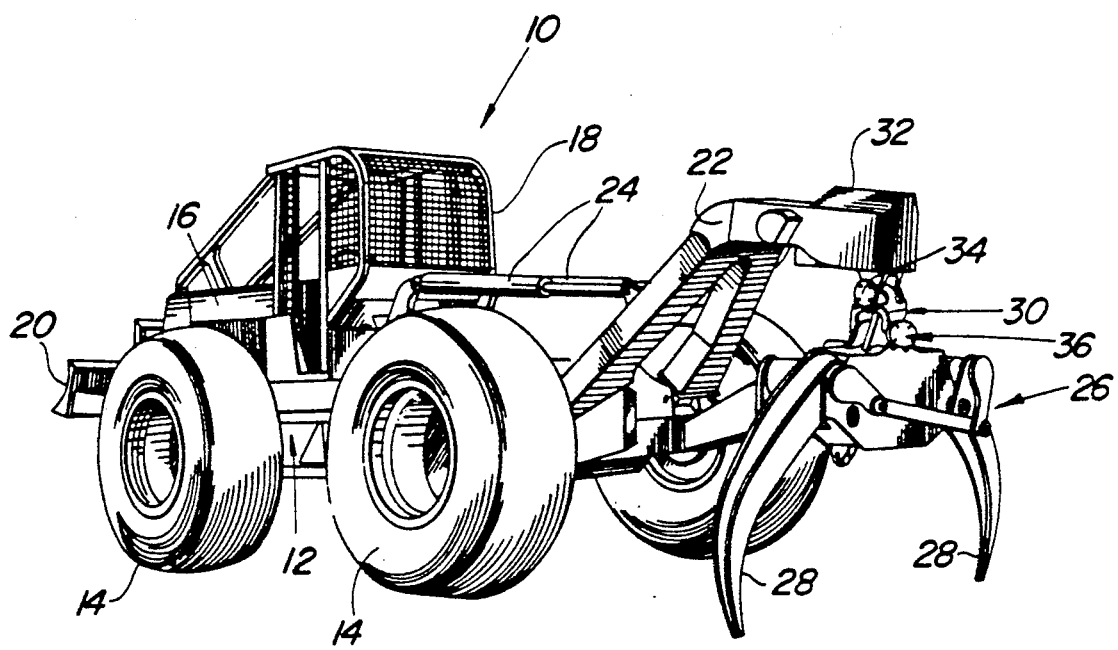
FIG. 1 is a rear perspective view of a grapple skidder.

FIG. 1 illustrates a grapple skidder 10 having a supporting frame 12 and wheels 14. The wheels comprise ground engaging means for supporting and propelling the supporting structure. The supporting structure is provided with an engine compartment 16 and an operator's cab 18. A dozer blade 20 extends from the front of the supporting frame by a suitable linkage. not shown.

A boom 22 is pivotally mounted to the rear of the supporting structure. It can be selectively positioned by boom positioning hydraulic cylinders 24. A grapple 26 having tongs 28 is supported from the boom by swivel link 30. The grapple may be rotated relative to the boom by a hydraulic motor located in the top of the boom at 32. It should be noted that the rotator motor could also be located in the head of the grapple.

Figure 2:
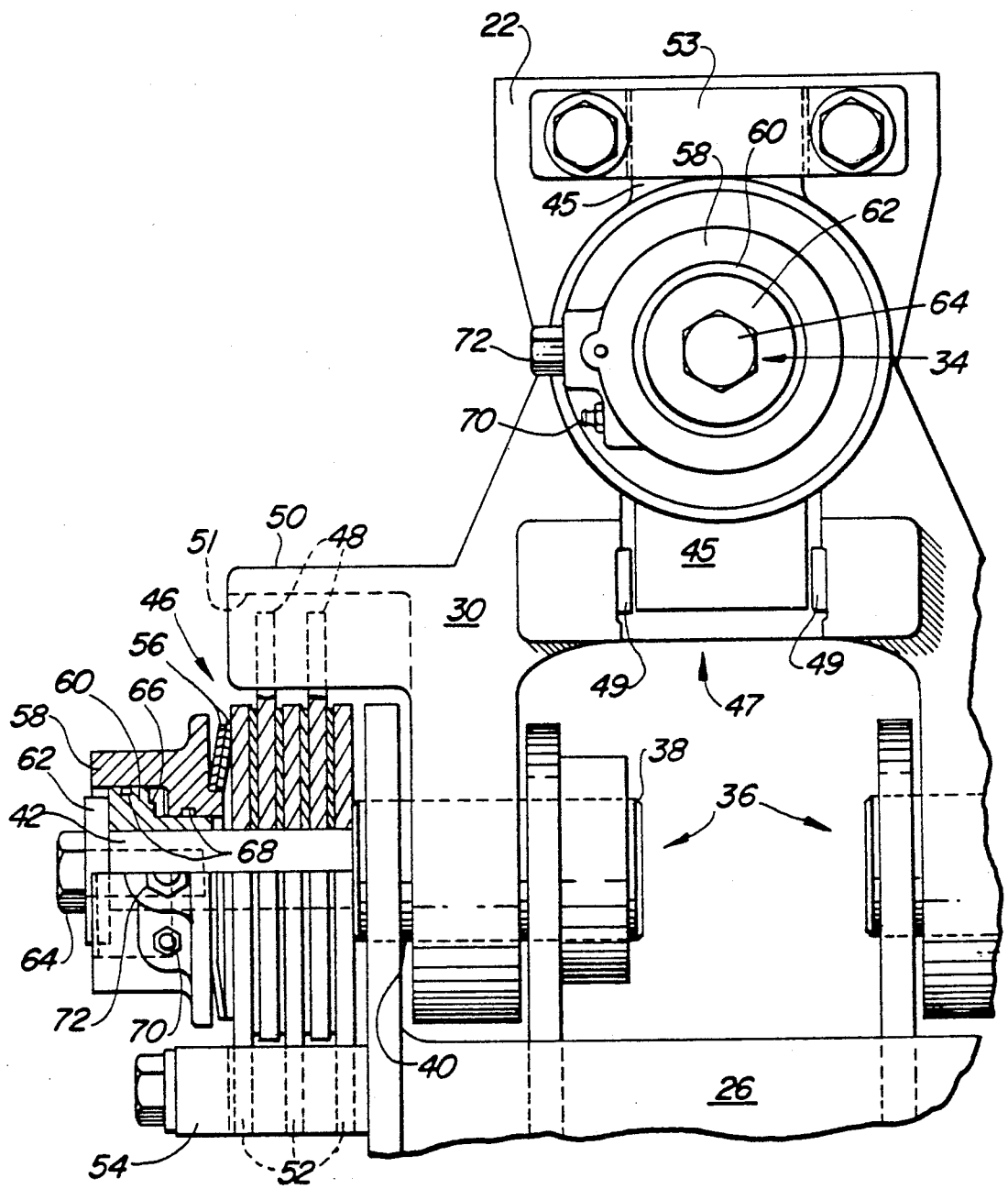
FIG. 2 is a partial cross sectional view of the swivel link of a grapple skidder using the subject invention.

The swivel link is best illustrated in FIG. 2 and is provided with first and second orthogonal pivot connections 34 and 36, respectively. Each pivot connection is relatively conventional having two pivot pins located on opposite sides of the vertical centerline of the swivel link. In describing the present invention, the first pivot connection will be defined as having a first pivot pin, and the second pivot connection will be defined as having a second pivot pin. The first and second pivot pins are not necessarily the only pivot pins associated with each pivot connection, but are the ones to which the first and second grease loaded dampeners are mounted.

The first pivot connection is provided with a first stepped pivot pin, not shown, which is identical to the second stepped pivot pin 38 located in the second pivot connection 36. The stepped pivot pin is provided with an enlarged portion 40 and a smaller portion 42. The enlarged portion of the first and second pivot pins carry the pivot journals for pivotally supporting the swivel link relative to the boom and the grapple relative to the swivel link respectively. The dampener is mounted to the smaller portion of the stepped pivot pins.

It should be noted that the second grease loaded dampener of the second pivot connection will be discussed in detail as it is identical to the grease loaded dampener of the first pivot connection.

The second grease loaded dampener illustrated in FIG. 2 is structurally identical to the first grease loaded dampener, except that it dampens oscillations between the swivel link and the grapple; whereas the first dampener reduces the oscillations between the boom and the swivel link. The second grease loaded dampener comprises a second set of friction plates 46. These plates are mounted to the smaller portion 42 of the second pivot pin. Two of the friction plates 48 are tanged to channel 50 which is integral with the swivel link. The channel 50 is formed by two outwardly projecting members, and is provided with two bearing blocks 51 which contact the side edges of the friction plates extending into the channel. The three remaining friction plates 52 are sandwiched around friction plates 48 and are tanged to U-shaped catch 54 which is bolted to the grapple.

In the first pivot connection, some of the first set of friction plates 45 are tanged to the swivel link by channel 47 having bearing blocks 49 and the remaining plates are tanged to the boom by U-shaped catch 53 which is bolted to the boom. It should be noted that U-shaped catches identical to the ones used for coupling the friction plates to the boom and grapple head can be used to couple the friction plates to the swivel link rather than the integrally formed channels. The remaining elements of the first pivot connection are identical to the second pivot connection and as such the numbers used for identifying these elements will be the same.

The friction plates are contacted by Belleville springs 56. The Belleville springs in turn are contacted by annular piston 58 which is slidably mounted to bushing 60. The piston together with the Belleville springs forms a means for applying a compressing force to the friction plates. Bushing 60 is mounted to the pivot pin and restrained from outward movement by washer 62 and bolt 64. Bolt 64 is axially received in the end face of the pivot pin. A donut-shaped cylinder 66 is formed between the bushing and the annular piston. This cylinder is sealed by suitable seals 68. Pressurized grease can be injected into this space by a grease gun through grease zerk 70. The cylinder forms a means for increasing the compressing force applied to the friction plates by the piston and Belleville washers.

Pressure relief valve 72 is in fluid communication with cylinder 66 and is used to drain off excess grease when the cylinder becomes over-pressurized with grease. Such a pressure relief valve is supplied by Fluid Line Products, of Willoughby, Ohio. The pressure relief valve forms a means for limiting the amount of compressing force applied to the friction plates. The pressure setting on the pressure relief valve can be set so that it corresponds to the highest desired pressure applied to the friction plates. In this way an operator applies grease to the grease zerk until grease is expelled through the pressure relief valve.

With this invention an operator of the cable skidder can grease the dampener whenever he is greasing the other joints of the skidder. The pressure relief valve insures that the dampener is properly pressurized at all times.

The present invention should not be limited to the above described grease loaded dampener, but should be limited solely by the claims that follow.

We claim:

1. A grapple suspension assembly comprising:

a swivel link having a first pivot connection for pivotally coupling the swivel link to a boom and a second pivot connection which is generally orthogonally arranged respective of the first pivot connection for pivotally coupling the swivel link to a grapple;

a first pivot pin located in the first pivot connection;

a second pivot pin located in the second pivot connection;

a first set of friction plates mounted to the first pivot pin and operatively coupled to the swivel link, the first set of friction plates also being adapted to be mounted to a boom for providing a braking force between the swivel link and a boom to which the swivel link is mounted;

a first grease dampener mounted to the first pivot pin and in contact with the first set of friction plates for compressing the first set of friction plates when pressurized grease is applied to the dampener, the first dampener comprises a grease zerk for injecting grease into the first dampener, a first pressure relief valve for releasing pressurized grease from the first dampener when the grease pressure in the first dampener exceeds a preset level whereby the first pressure relief valve prevents the first grease dampener from over-compressing the first set of friction plates, a first bushing mounted to the first pin and a first annular piston slidably mounted to the first bushing and in contact with the first set of friction plates, and a first cylinder is formed between the first bushing and the first annular piston, whereby when pressurized grease is applied to the first cylinder, the first annular piston is driven towards the first set of friction plates increasing the braking force between the swivel link and a boom to which the swivel link is mounted, the first pivot pin is a stepped pin having an enlarged portion located in the first pivot connection and a smaller portion located in the first set of friction plates and the first bushing;

a second set of friction plates mounted to the second pivot pin and operatively coupled to the swivel link, the second set of friction plates also being adapted to be mounted to a grapple for providing a braking force between the swivel link and a grapple to which the swivel link is mounted; and a second grease dampener mounted to the second pivot pin and in contact with the second set of friction plates for compressing the second set of friction plates when pressurized grease is applied to the second dampener, the second dampener comprises a grease zerk for injecting grease into the second dampener, a second pressure relief valve for releasing pressurized grease from the second dampener when the grease pressure inside the second dampener exceeds a preset level whereby the second pressure relief valve prevents the second grease dampener from over-compressing the second set of friction plates, a second bushing mounted to the second pin and a second annular piston slidably mounted to the second bushing and in contact with the second set of friction plates, and a second cylinder is formed between the second bushing and the second annular piston, whereby when pressurized grease is applied to the second cylinder, the second annular piston is driven toward the second set of friction plates increasing the braking force between the swivel link and a grapple to which the swivel link is mounted, the second pivot pin is a stepped pin having an enlarged portion located in the second pivot connection and a smaller portion located in the second set of friction plates and the second bushing wherein the smaller portion of the first pivot pin is provided with a bolt and a retaining washer against which abuts the first bushing, and the smaller portion of the second pivot pin is provided with a bolt and a retaining washer against which abuts the second bushing.

2. A grapple skidder for skidding logs comprising:

a support structure;

ground engaging means coupled to the support structure for supporting and propelling the support structure;

a boom extending from the support structure;

a grapple extending from the boom;

a swivel link coupling the grapple to the boom, the swivel link having a first pivot connection and a first pivot pin for pivotally coupling the swivel link to the boom and a second pivot connection and a second pivot pin which is generally orthogonally arranged to the first pivot connection for pivotally coupling the swivel link to the grapple;

a first set of friction plates mounted to the first pivot pin and operatively coupled to the swivel link and the boom, the first set of friction plates providing a braking force between the swivel link and the boom;

a first grease cylinder mounted to the first pivot pin and in contact with the first set of friction plates for compressing the first set of friction plates when pressurized grease is applied to the cylinder, the first cylinder comprises a grease zerk for injecting grease into the first cylinder, a first pressure relief valve for releasing pressurized grease from the first cylinder when the grease pressure in the first cylinder exceeds a preset level whereby the first pressure relief valve prevents the first grease cylinder from over-compressing the first set of friction plates, a first bushing mounted to the first pin and a first annular piston slidably mounted to the first bushing and in contact with the first set of friction plates, whereby when pressurized grease is applied to the first cylinder, the first annular piston is driven towards the first set of friction plates increasing the braking force between the swivel link and a boom to which the swivel link is mounted, the first pivot pin is a stepped pin having an enlarged portion located in the first pivot connection and a smaller portion located in the first set of friction plates and the first bushing;

a second set of friction plates mounted to the second pivot pin and operatively coupled to the swivel link and the grapple, the second set of friction plates providing a braking force between the swivel link and the grapple; and a second grease cylinder mounted to the second pivot pin and in contact with the second set of friction plates for compressing the second set of friction plates when pressurized grease is applied to the second cylinder, the second cylinder comprises a grease zerk for injecting grease into the second cylinder, a second pressure relief valve for releasing pressurized grease from the second cylinder when the grease pressure inside the second cylinder exceeds a preset level whereby the second pressure relief valve prevents the second grease cylinder from over-compressing the second set of friction plates, a second bushing mounted to the second pin and a second annular piston slidably mounted to the second bushing and in contact with the second set of friction plates, whereby when pressurized grease is applied to the second cylinder, the second annular piston is driven toward the second set of friction plates increasing the raking force between the swivel link and a grapple to which the swivel link is mounted, the second pivot pin is a stepped pin having an enlarged portion located in the second pivot connection and a smaller portion located in the second set of friction plates and the second bushing;

wherein the smaller portion of the first pivot pin is provided with a bolt and a retaining washer against which abuts the first bushing, and the smaller portion of the second pivot pin is provided with a bolt and a retaining washer against which abuts the second bushing.

* * * * *